US012528669B2

(12) United States Patent
D'Apice et al.

(10) Patent No.: US 12,528,669 B2
(45) Date of Patent: Jan. 20, 2026

(54) ELEVATOR SYSTEM WITH AN INSTALLATION BRACKET

(71) Applicant: Inventio AG, Hergiswil (CH)

(72) Inventors: Alessandro D'Apice, Ebikon (CH); Romeo Lo Jacono, Gravesano (CH)

(73) Assignee: INVENTIO AG, Hergiswil (CH)

( * ) Notice: Subject to any disclaimer, the term of this patent is extended or adjusted under 35 U.S.C. 154(b) by 0 days.

(21) Appl. No.: 18/254,387

(22) PCT Filed: Nov. 29, 2021

(86) PCT No.: PCT/EP2021/083336
§ 371 (c)(1),
(2) Date: May 25, 2023

(87) PCT Pub. No.: WO2022/117496
PCT Pub. Date: Jun. 9, 2022

(65) Prior Publication Data
US 2024/0034596 A1 Feb. 1, 2024

(30) Foreign Application Priority Data
Dec. 1, 2020 (EP) .................................... 20210965

(51) Int. Cl.
*B66B 7/02* (2006.01)

(52) U.S. Cl.
CPC .................................... *B66B 7/024* (2013.01)

(58) Field of Classification Search
CPC .............................. B66B 7/024; B66B 19/002
See application file for complete search history.

(56) References Cited

U.S. PATENT DOCUMENTS

| | | | | | |
|---|---|---|---|---|---|
| 103,292 | A * | 5/1870 | Brown | B66B 7/024 | 187/408 |
| 957,531 | A * | 5/1910 | Winslow | E04B 1/2403 | 403/217 |
| 1,051,335 | A * | 1/1913 | King | B66B 7/022 | 187/408 |
| 3,601,938 | A * | 8/1971 | Loomis | B66B 13/306 | 187/408 |
| 3,741,351 | A * | 6/1973 | Suozzo | B66B 13/30 | 52/30 |
| 3,948,358 | A | 4/1976 | Atkey | | |
| 5,915,501 | A * | 6/1999 | Lodi | B66B 13/301 | 52/30 |

(Continued)

FOREIGN PATENT DOCUMENTS

| | | | | |
|---|---|---|---|---|
| AU | 2021241766 B2 * | 9/2024 | | B66B 7/024 |
| CN | 204980743 U | 1/2016 | | |

(Continued)

*Primary Examiner* — Minh Truong
(74) *Attorney, Agent, or Firm* — Shumaker, Loop & Kendrick, LLP

(57) ABSTRACT

An elevator system has an installation bracket fixed in an aligned manner in a region of a door-side shaft wall of an elevator shaft, wherein guide rails for guiding an elevator car arranged in the elevator shaft are fixed on the installation bracket. The installation bracket is fixed exclusively by at least one floor fixing section, wherein the at least one floor fixing section is fixed on a horizontal surface of the floor.

11 Claims, 4 Drawing Sheets

(56) References Cited

U.S. PATENT DOCUMENTS

| | | | | |
|---|---|---|---|---|
| 6,196,356 | B1 * | 3/2001 | Sneed | B66B 19/00 403/14 |
| 6,830,133 | B2 * | 12/2004 | Sneed | B66B 7/02 187/408 |
| 7,147,086 | B2 * | 12/2006 | Ach | B66B 7/024 187/408 |
| 7,165,656 | B2 * | 1/2007 | Valjus | B66B 7/021 187/408 |
| 9,561,936 | B2 * | 2/2017 | Miller | B66B 13/306 |
| 11,498,812 | B2 * | 11/2022 | Haapaniemi | B66B 13/30 |

FOREIGN PATENT DOCUMENTS

| | | | | | |
|---|---|---|---|---|---|
| CN | 109132815 | A | | 1/2019 | |
| EP | 1321416 | A1 | | 6/2003 | |
| JP | S6156372 | U | | 4/1986 | |
| JP | H01256484 | A | | 10/1989 | |
| JP | 2001163548 | A | * | 6/2001 | B66B 7/024 |
| JP | 2004256216 | A | | 9/2004 | |
| JP | 2013049509 | A | | 3/2013 | |
| JP | 2013124142 | A | | 6/2013 | |
| WO | 2006054982 | A2 | | 5/2006 | |
| WO | WO-2023237591 | A1 | * | 12/2023 | B66B 19/002 |

* cited by examiner

ELEVATOR SYSTEM WITH AN INSTALLATION BRACKET

FIELD

The invention relates to an elevator system having an installation bracket fixed in the region of a door-side shaft wall of an elevator installation.

BACKGROUND

Elevator systems comprise an elevator car which is usually arranged such that it can move along a vertically oriented elevator shaft. Guide rails for guiding the elevator car are arranged along the elevator shaft. The guide rails consist substantially of individual guide rail segments which are fixed in the elevator shaft by means of installation brackets.

EP 1 321 416 discloses a guide rail arrangement for elevators with such an installation bracket. This installation bracket has a U-shape, wherein the crossmember of the installation bracket is fixed to the door-side shaft wall. In addition, the installation bracket has two legs which extend from the ends of the crossmember into the elevator shaft. Guide rails or guide rail segments are fastened to these legs. Both the crossmember and the legs are accordingly arranged within the cross-sectional area of the elevator shaft, whereby the free cross-sectional area of the elevator shaft that is suitable for a movability of the elevator car is reduced. In the following, the cross-sectional area of the elevator shaft means the area, viewed in plan view or in the vertical direction, for the empty space assigned to the elevator shaft. The cross-sectional area, which is in many cases rectangular, of the elevator shaft is bounded by the shaft walls. Furthermore, such a fixability of the installation bracket on the door-side shaft wall means that the installation work necessary for the installation bracket has to be carried out by the fitter in the interior of the elevator shaft, which puts the safety of the fitter in jeopardy.

SUMMARY

An object of the invention is to propose an elevator system, the installation of which ensures a higher level of safety for the fitter.

This object is achieved by an elevator system having an installation bracket fixed in the region of the door-side shaft wall, wherein guide rails for guiding an elevator car which are arranged in an elevator shaft can be fixed or are fixed to the installation bracket, wherein for fixing the installation bracket the installation bracket preferably can be fixed or is fixed by means of at least one floor fixing section, wherein the floor fixing section is arranged or can be arranged on a horizontal surface of the floor.

The invention is based on the finding that only the arrangement of the shaft doors is decisive for the positioning of all substantial components of the elevator car relating to the movability of the elevator car. Accordingly, the installation bracket for fixing the guide rails in the elevator shaft is to be aligned in relation to the shaft door that is installed or is to be installed. Consequently, it is sufficient for the installation bracket to be connected or connectable, in particular fixed or fixable, exclusively in a region of the substantially horizontally aligned floor surface.

The fitter can carry out fixing the installation bracket exclusively from the floor surface, so that additional safety measures are made possible, for example, closing the wall opening provided for the installation of the shaft door between the floor and the elevator shaft, for example by inserting an additional barricade device different from a shaft door. It is thus possible to prevent the fitter from entering or possibly falling into the elevator shaft. In other words, it is not necessary for the fitter to work in the elevator shaft itself in order to fix the installation bracket.

The fixing of the installation bracket to the horizontal surface of the floor can be designed such that the installation bracket is fixed or can be fixed directly to the concrete of the floor. In order to make this floor level for the later use of the building, the fixing of the installation bracket and the part of the installation bracket located in the vertical alignment of the floor can substantially be cast for example into the screed.

The installation bracket comprises a crossmember and two preferably rectangular side members extending from the crossmember, wherein a first of the side members is arranged at a first end of the crossmember and the second of the side members is arranged at the second end of the crossmember and the crossmember is arranged or can be arranged substantially within the floor (and more precisely within the cross-sectional area of the floor). Analogous to the above-mentioned cross-sectional area of the elevator shaft, the surface area of the floor means the area, seen in plan view or in the vertical direction, which is occupied by the floor. In contrast to the cross-sectional area of the elevator shaft, the cross-sectional area of the floor therefore does concern an empty space. The floor or the cross-sectional area of the floor thus also provides the floor-side area which is accessible to passengers and ends at the door-side shaft wall. Accordingly, an exclusive fixing of the installation bracket to the horizontal section of the floor makes it possible for the crossmember to occupy almost no cross-sectional area of the elevator shaft itself. In other words, the crossmember substantially does not project into the cross-sectional area of the elevator shaft.

The main components (i.e., the crossmember, the side members) of the installation bracket can have the following purpose: The crossmember comprising the at least one floor fixing section serves to fasten the installation bracket to the elevator shaft. The guide rails are fixed or can be fixed to the side members.

The crossmember can have a rib as a stop to the door-side shaft wall, which rib is preferably arranged or can be arranged at the end of the floor bounding the elevator shaft. The rib extending in the horizontal direction preferably between the side members can close the crossmember towards the elevator shaft. The rib can thus be the only segment of the crossmember which, at least in the installed state, is located or arranged within the cross-sectional area of the elevator shaft.

The installation bracket can be integrally formed or formed from a plurality of elements that can be fixed to one another. By way of example, the side members and the crossmember can be formed by connectable elements.

However, it is necessary that, in the case of an arrangement in each case of such an installation bracket on a plurality of shaft doors of the elevator installation, all of these installation brackets be aligned in accordance with a direction of travel of the elevator car, usually vertically. Dimensional tolerances during the creation of the elevator shaft can then have the consequence that the crossmember of the installation bracket projects into the cross-sectional area of the elevator shaft.

The side members are arranged or can be arranged within the cross-sectional area of the elevator shaft. In this way, guide rails, for example on the ends of the side members arranged in the elevator shaft, can be fixed within the cross-sectional area of the elevator shaft and only the components of the installation bracket that are necessary for positioning can be arranged within the cross-sectional area of the elevator shaft.

In a development of the elevator system, the at least one floor fixing section is designed in such a way that the installation bracket is adjustably fixed or can be adjustably fixed. Adjustably fixed or can be adjustably fixed means that such a preliminary fixing is made possible before a final alignment and subsequent final fixing of the installation bracket. For example, this can be achieved by means of a threaded connection which enables a horizontal sliding movement of the installation bracket in its preliminary fixed state. In this case, the floor fixing section designed as a passage opening, for example, can be designed to be larger than the dimension of the screw requires by means of which the installation bracket is fastened or can be fastened to the floor. A shim plate formed in accordance with a washer causes the installation bracket to be preliminarily fixed or finally fixed to the floor by the degree of its pressing against the installation bracket by means of the screw. Such an adjustability makes possible a preliminary fixing of the installation bracket to the floor and a subsequent alignment and final fixing of the installation bracket in the elevator shaft by means of alignment elements that can be arranged in the elevator shaft.

In a development of the elevator system, the installation bracket has at least one adjustment point for aligning the installation bracket within the elevator system. Such an adjustment point can be designed, for example, as a passage point for an alignment element running within the elevator system, for example a plumb line or a laser beam. Consequently, in the state installed in the elevator system the adjustment point is formed within the cross-section of the elevator shaft. In other words, this adjustment point is formed outside the vertical alignment of the shaft floor. The installation bracket preferably has two adjustment points. In this way, the preferably preliminarily fixed installation bracket can be finally aligned by means of alignment elements in the elevator shaft. Finally aligned means that the installation bracket holds exactly the position in which the guide rails or guide rail segments to be fixed on the installation bracket ensure within all dimensional tolerances a movability of the elevator car that can be guided on the guide rails.

Such alignment elements are used to align components, such as shaft doors or installation brackets to be installed in the elevator shaft, correctly with respect to the subsequently intended travel direction of the elevator car. Such alignment elements can be formed by plumb lines or laser beams, for example.

In a development of the elevator system, the installation bracket has two floor fixing sections. The installation bracket can be fixed on the floor surface by means of these floor fixing sections. A securely aligned fixation of the installation bracket in the elevator system is thus made possible.

In a development of the elevator system, substantial components of the shaft door arranged on the floor are arranged within the vertical alignment of the floor. This means that these substantial components of the shaft door are arranged substantially outside the cross-sectional area of the elevator shaft. Consequently, the advantage results that the cross-sectional area of the elevator shaft can be used to the greatest possible extent by an elevator car or for the movement of the elevator car. Due to the absence of floor fixing sections for fixing the installation bracket and, on the other hand, substantial components of the shaft door within the cross-sectional area of the elevator shaft, such a high utilization of the cross-sectional area of the elevator shaft, can be realized by the elevator car.

The shaft door that can be provided for installation on the installation bracket comprises at least one door leaf. Substantial components of the shaft door can comprise this at least one door leaf of this shaft door and/or a door sill and/or at least one door leaf guide rail for guiding this at least one door leaf. Furthermore, the shaft door can contain coupling elements which are needed for the mechanical coupling of the car door to the shaft door. These coupling elements can project into the cross-sectional area of the elevator shaft.

DESCRIPTION OF THE DRAWINGS

The invention is explained in greater detail below with reference to drawings. In the drawings.

DETAILED DESCRIPTION

Figure 1:
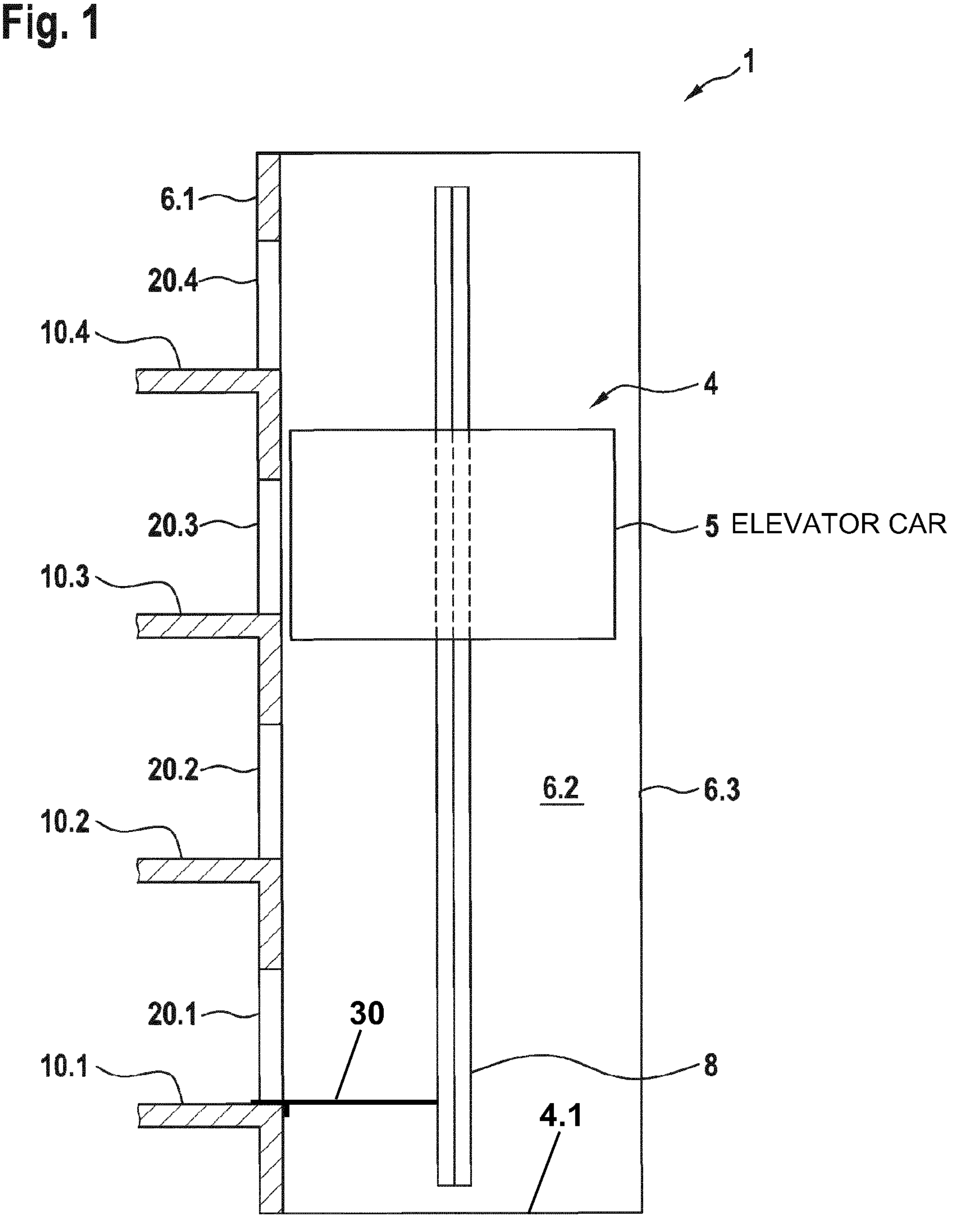
FIG. 1: shows an elevator system with a guide rail arranged in the elevator shaft.

FIG. 1 shows an elevator system 1. The elevator system 1 comprises an elevator shaft 4. The elevator shaft 4 is bounded at its lower end by a shaft floor 4.1. The elevator shaft 4 is bounded laterally by a door-side shaft wall 6.1. Further shaft walls 6.2, 6.3 bounding the elevator shaft 4 can be present. The door-side shaft wall 6.1 has a plurality of shaft door openings 20.1, 20.2, 20.3, 20.4 or wall openings arranged one above the other by means of which the elevator shaft 4 is connected to floors 10.1, 10.2, 10.3, 10.4 located one above the other.

A guide rail 8, on which an elevator car 5 can be guided, is arranged along the orientation of the elevator shaft 4. This guide rail 8 is usually formed by a plurality of guide rail segments (not shown) arranged one above the other. In addition, further guide rails can be arranged in the elevator shaft 4 in order to be able to guide the elevator car 5 and, if applicable, also a counterweight (not shown) which is movable in the opposite direction to the elevator car 5.

An installation bracket 30 fixed in the elevator system 1 is shown in the region of the lowest of the floors 10.1. The installation bracket 30 makes it possible to fix the guide rail 8, in particular a lowermost of the guide rail segments belonging to the guide rail 8. The elevator system 1 can comprise further such installation brackets, wherein each of these installation brackets can be fixed separately to another of the floors 10.2, 10.3, 10.4 located above the lowest floor 10.1. To relieve the load on the installation bracket 30, the guide rail 8 or the guide rail segment fixed to the installation bracket 30 can be set on the shaft floor 4.1, in particular supported by this shaft floor 4.1.

Figure 2:
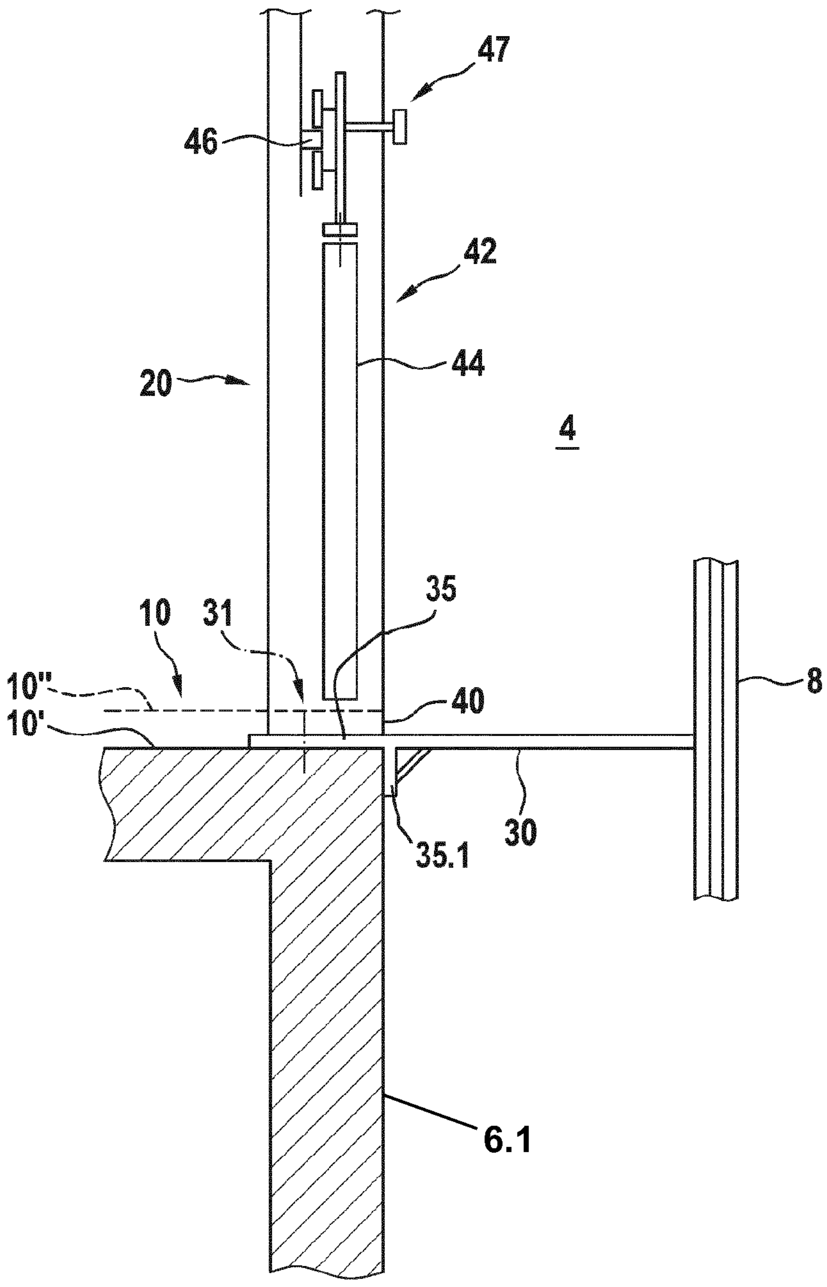
FIG. 2: shows a shaft door and an installation bracket arranged on a floor.

FIG. 2 shows a shaft door opening 20 arranged on one of these floors 10. A shaft door 42 is arranged at this shaft door opening 20. The floor 10 comprises a concrete surface 10' and can comprise a walk-on surface 10" that can be walked on during conventional use of the floor 10, wherein the walk-on surface 10" can be formed for example by application of a screed.

The installation bracket 30 for fixing at least one guide rail 8 or at least one guide rail segment is accordingly fixed on the floor 10 by means of at least one floor fixing section 31, preferably before application of the exemplary screed to the concrete surface 10'. A door sill 40 can be arranged above the at least one floor fixing section 31 so that with the walk-on surface 10" the door sill 40 forms a substantially flat area. In addition, the door sill 40 can be integrated in the walk-on surface 10" in such a way that the walk-on surface 10" does not form a shoulder or a groove or the like.

It can also be seen from FIG. 2 that the floor fixing section 31, formed for example by a crossmember 35, is closed by a stop denoted by 35.1. This stop 35.1 abuts the door-side shaft wall 6.1.

Substantial components of the shaft door 42 are arranged in the vertical alignment of the floor 10. This means that these substantial components of the shaft door 42 are arranged outside the cross-sectional area of the elevator shaft 4. The substantial components of the shaft door 42 comprise, for example, the door sill 40, a door leaf 44 and a guide rail 46 for guiding the door leaf 44. The shaft door 42 can moreover comprise further door leaves 44, wherein the shaft door 42 can be designed to close centrally or telescopically.

In addition, the shaft door 42 can comprise coupling elements 47 for mechanical coupling to a coupling unit arranged on the elevator car. The elevator car can accordingly comprise a car door having a door drive motor. This door drive motor is provided, for example, for a synchronous opening/closing of the shaft door coupled to the car door and, if applicable, also for unlocking the car door and/or the shaft door. With respect to the shaft door 42, the coupling unit accordingly fulfills the purpose of establishing an operative connection between the door drive motor and the shaft door 42. Such coupling elements 47 accordingly project into the cross-sectional area of the elevator shaft 4.

Figure 3:
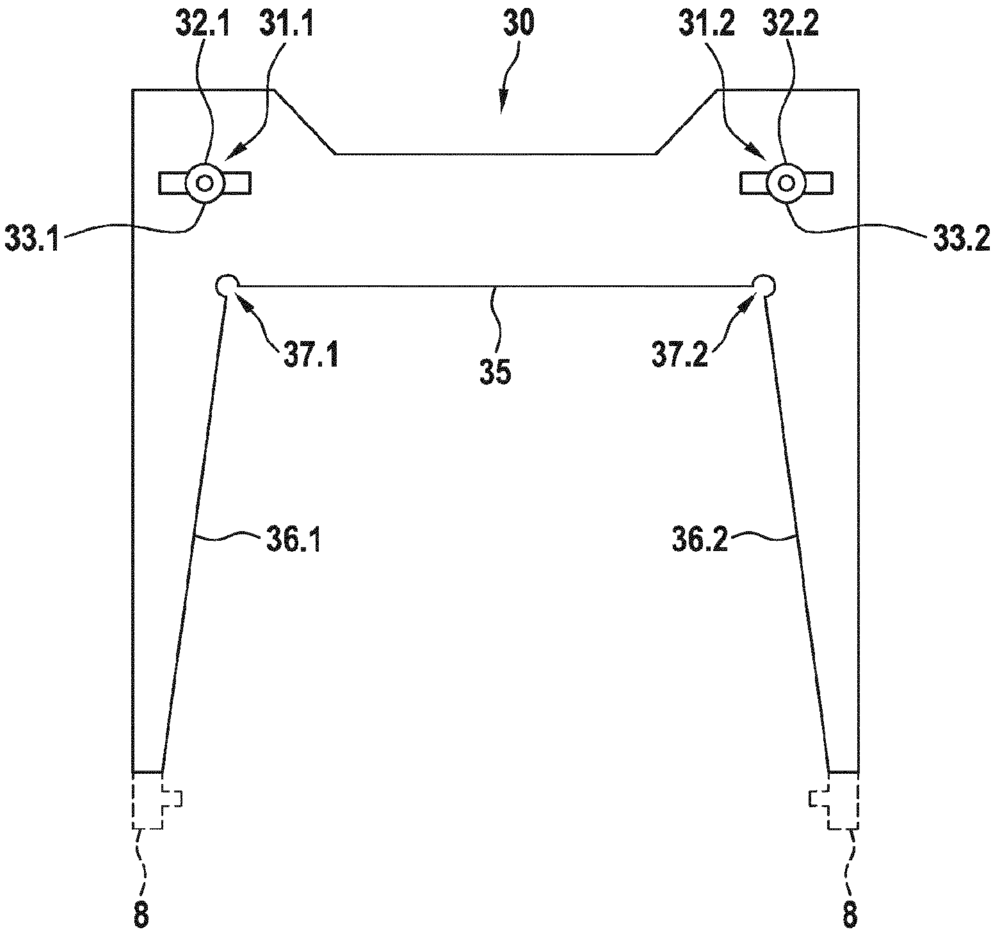
FIG. 3: shows an installation bracket.

FIG. 3 shows such an installation bracket 30. The installation bracket 30 comprises a crossmember 35 and two side members 36.1, 36.2, preferably extending at right angles to the crossmember 35. A guide rail 8 is fastened or can be fastened in each case to the ends of these side members 36.1, 36.2.

The installation bracket 30 comprises two floor fixing sections 31.1, 31.2 which are arranged along the crossmember 35 for directly fixing the crossmember 35 to a floor. By way of example, the installation bracket 30 can be fixed with screws 32.1, 32.2 or similar fastening elements that are to be anchored in the floor.

The fixing sections 31.1, 31.2 are in each case formed by a through-opening 33.1, 33.2. By means of such a through-opening 33.1, 33.2, the installation bracket 30 can be fixed to the floor in an adjustable manner. Accordingly, a washer can be used for adjustable fixation. Adjustment points 37.1, 37.2 enable adjustability with respect to further installation brackets 30 arranged in the elevator shaft by means of exemplary plumb lines or comparable alignment elements such as laser beams suitable for aligning the installation bracket 30.

The installation bracket 30 can be adjustably fixed to the floor in the horizontal direction. This can be achieved for example by the floor fixing sections 31.1, 31.2 being designed as elongated holes or an oversized dimension in comparison with the corresponding dimension of the fastening elements 32.1, 32.2 used for fixing.

Figure 4:
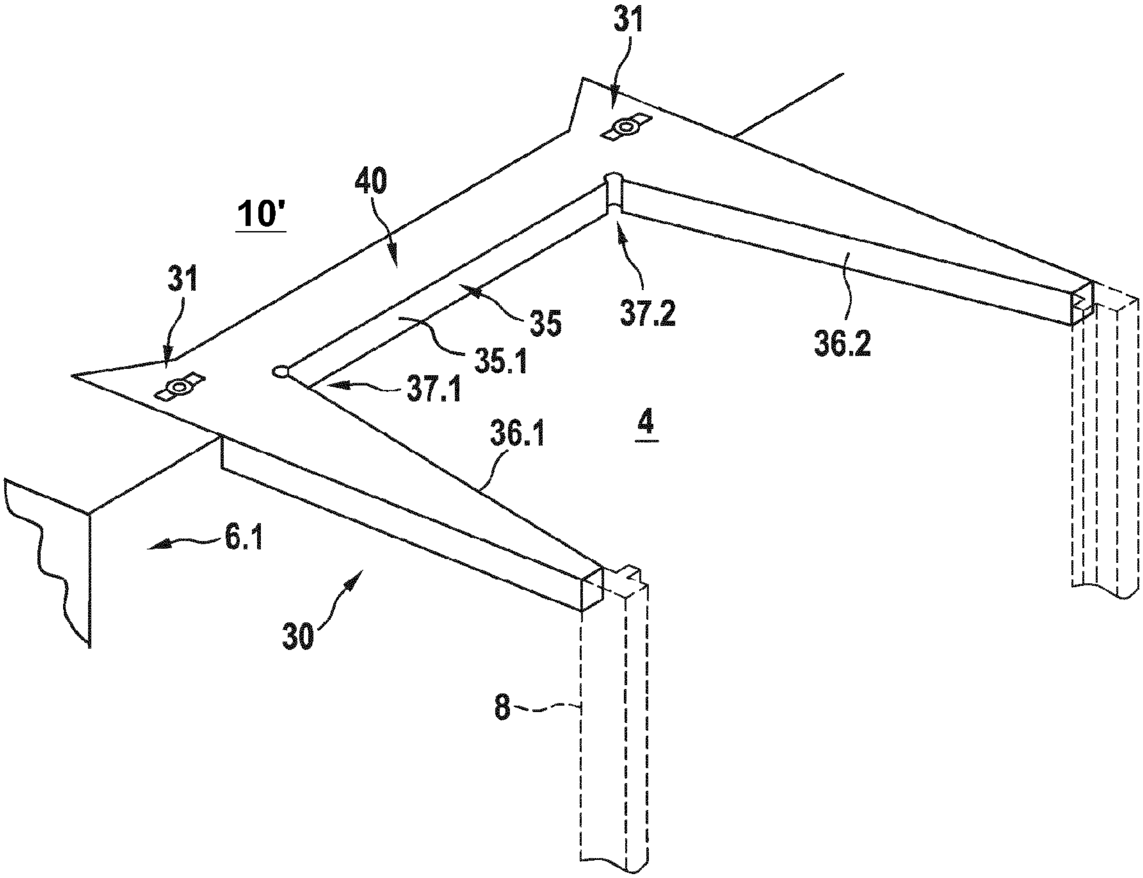
FIG. 4: shows an installation bracket fixed to the floor.

FIG. 4 shows an installation bracket 30 fixed to a floor. The installation bracket 30 is fixed directly to the concrete floor 10' by means of its crossmember 35. The crossmember 35 can have a rib or stop 35.1 which can be arranged at the end of the floor that bounds the elevator shaft 4. The rib 35.1 forms a stop towards the door-side shaft wall 6.1 and can close the crossmember towards the elevator shaft. The rib extends in a horizontal direction between the side members 36.1 and 36.2. When the installation bracket 30 is properly fixed to the floor, this rib 35.1 preferably projects vertically downward so that a minimum distance of the guide rail, which can be fixed on the installation bracket 30, from the floor can accordingly be maintained by means of this rib 35.1.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. An elevator system having an elevator shaft laterally bounded by a door-side shaft wall, the door-side shaft wall having a shaft door opening connecting the elevator shaft to an associated floor, the elevator system comprising:

an installation bracket fixed at the shaft door opening of the door-side shaft wall;

wherein the installation bracket is adapted to fix guide rails in the elevator shaft, the guide rails, when fixed in the elevator shaft, guiding an elevator car;

the installation bracket including at least one floor fixing section adapted to fix the installation bracket to a horizontal surface of the associated floor;

the installation bracket including a crossmember forming the at least one floor fixing section and two side members extending from and running at right angles to the crossmember, each of the side members adapted to fasten one of the guide rails, each of the side members being tapered with a wider end proximal to the crossmember;

wherein a first of the side members is arranged at a first end of the crossmember and a second of the side members is arranged at a second end of the crossmember;

wherein the crossmember is positioned on the associated floor outside of the elevator shaft and is closed by a vertical rib at the door-side shaft wall;

a shaft door arranged at the shaft door opening outside a cross-sectional area of the elevator shaft, the shaft door having components arranged in vertical alignment at the associated floor; and wherein the shaft door components outside the cross-sectional area of the elevator shaft include at least one door leaf, and/or a door sill and/or at least one door leaf guide rail for guiding the at least one door leaf.

2. The elevator system according to claim 1 wherein the crossmember rib abuts the door-side shaft wall and projects downwardly in the elevator shaft.

3. The elevator system according to claim 1 wherein the side members are arranged within a cross-sectional area of the elevator shaft and are adapted to fix the guide rails in the elevator shaft.

4. The elevator system according to claim 1 wherein the at least one floor fixing section includes a through-opening cooperating with a fastening element to fix the installation bracket to the associated floor.

5. The elevator system according to claim 4 wherein the through-opening is an elongated hole enabling adjustment of a position of the installation bracket on the associated floor.

6. The elevator system according to claim 1 wherein the installation bracket has two of the at least one floor fixing section.

7. The elevator system according to claim 1 wherein the installation bracket has at least one adjustment point to align the installation bracket within the elevator shaft.

8. The elevator system according to claim 1 wherein the installation bracket is only fixed to the horizontal surface of the associated floor.

9. An installation bracket for fixing guide rails in an elevator shaft to guide an elevator car, the elevator shaft laterally bounded by a door-side shaft wall, the door-side shaft wall having a shaft door opening connecting the elevator shaft to an associated floor, the installation bracket comprising:

a crossmember forming two spaced apart floor fixing sections;

wherein the floor fixing sections are adapted to fix the installation bracket to a horizontal surface of the associated floor;

two side members running at right angles to and extending from the crossmember, each of the side members being tapered with a wider end proximal to the crossmember;

wherein one of the side members is arranged at one end of the crossmember and another of the side members is arranged at another end of the crossmember, the side members extending into the elevator shaft when the crossmember is fixed on the associated floor, and each of the side members being adapted to fix an associated guide rail in the elevator shaft; and wherein the crossmember is positioned entirely outside of the elevator shaft when fixed to the associated floor and is closed by a vertical rib at the door-side shaft wall, the vertical rib not being fixed to the door-side shaft wall.

10. The installation bracket according to claim 9 wherein the crossmember rib abuts the door-side shaft wall and projects downwardly in the elevator shaft when the crossmember is fixed on the associated floor.

11. The installation bracket according to claim 9 wherein the floor fixing sections each include a through-opening cooperating with a fastening element to fix the installation bracket to the associated floor, and wherein each of the through-openings is an elongated hole enabling adjustment of a position of the installation bracket on the associated floor.

* * * * *